US012743633B2

(12) United States Patent
Zhang et al.

(10) Patent No.: US 12,743,633 B2
(45) Date of Patent: Sep. 22, 2026

(54) COLLABORATIVE TRAINING WITH PARALLEL OPERATIONS

(71) Applicant: Rakuten Mobile, Inc., Tokyo (JP)

(72) Inventors: Zihan Zhang, St Andrews (GB); Blesson Varghese, St Andrews (GB); Philip Rodgers, London (GB); Ivor Spence, Belfast (GB); Peter Kilpatrick, Belfast (GB)

(73) Assignee: RAKUTEN MOBILE, INC., Tokyo (JP)

( * ) Notice: Subject to any disclaimer, the term of this patent is extended or adjusted under 35 U.S.C. 154(b) by 727 days.

(21) Appl. No.: 18/249,736

(22) PCT Filed: Nov. 11, 2022

(86) PCT No.: PCT/US2022/049639
§ 371 (c)(1),
(2) Date: Apr. 20, 2023

(87) PCT Pub. No.: WO2024/102137
PCT Pub. Date: May 16, 2024

(65) Prior Publication Data

US 2024/0394555 A1 Nov. 28, 2024

(51) Int. Cl.
*G06N 3/098* (2023.01)
*G06N 3/084* (2023.01)

(52) U.S. Cl.
CPC ............ *G06N 3/098* (2023.01); *G06N 3/084* (2013.01)

(58) Field of Classification Search
CPC ......... G06N 3/045; G06N 3/084; G06N 3/098
See application file for complete search history.

(56) References Cited

U.S. PATENT DOCUMENTS

2022/0253713 A1* 8/2022 Amid ..................... G06N 3/098
2022/0292342 A1* 9/2022 Ben-Itzhak ............ G06N 3/045
2022/0366236 A1* 11/2022 Mesmakhosroshahi ..................... G06N 3/084
2022/0383084 A1* 12/2022 Lamy-Poirier ........ G06N 3/084

OTHER PUBLICATIONS

Choi et al., "Machine Learning Training Method Based on Parametric Synchronization Model and Training System thereof", published on Jan. 17, 2022, but filed on Jul. 8, 2020, Document ID: KR-20220006360-A, pp. 19 (Year: 2020).*

* cited by examiner

*Primary Examiner* — Chau T Nguyen
(74) *Attorney, Agent, or Firm* — HAUPTMAN HAM, LLP

(57) ABSTRACT

Neural networks are collaboratively trained with parallel operations by performing operations in a plurality of consecutive time periods including a first plurality of consecutive time periods during which the server receives a set of activations, applies the server partition to a set of activations, applies a set of output instances to a loss function, and computes a set of gradient vectors, and a second plurality of consecutive time periods during which the server transmits a set of gradient vectors.

20 Claims, 10 Drawing Sheets

COLLABORATIVE TRAINING WITH PARALLEL OPERATIONS

RELATED APPLICATIONS

The present application is a National Phase of International Application No. PCT/US2022/049639, filed Nov. 11, 2022.

BACKGROUND

Technical Field

This description relates to collaborative training techniques.

Background

Collaborative machine learning (CML) techniques, such as federated learning, are used to collaboratively train neural network models using multiple computation devices, such as end-user devices, and a server. CML techniques preserve the privacy of end-users because it does not require user data to be transferred to the server. Instead, local models are trained and shared with the server.

SUMMARY

According to at least some embodiments of the subject disclosure, neural networks are collaboratively trained with parallel operations by performing operations in a plurality of consecutive time periods including a first plurality of consecutive time periods during which the server receives a set of activations, applies the server partition to a set of activations, applies a set of output instances to a loss function, and computes a set of gradient vectors, and a second plurality of consecutive time periods during which the server transmits a set of gradient vectors.

Some embodiments include the instructions in a computer program, the method performed by the processor executing the instructions of the computer program, and an apparatus that performs the method. In some embodiments, the apparatus includes a controller including circuitry configured to perform the operations in the instructions.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
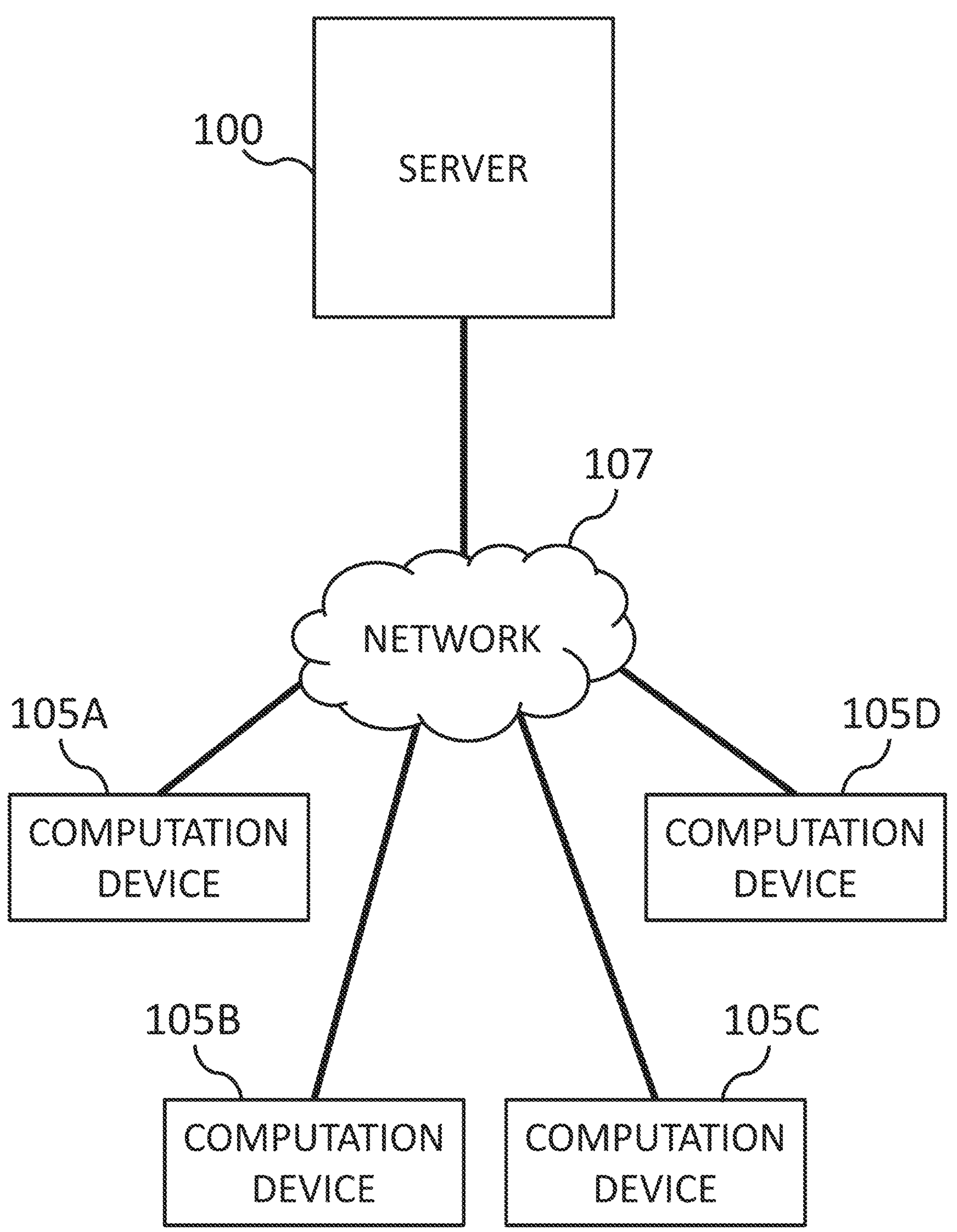
FIG. 1 is a schematic diagram of a system for collaborative training with parallel operations, according to at least some embodiments of the subject disclosure.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. In addition, the present disclosure may repeat reference numerals and/or letters in the various examples. This repetition is for the purpose of simplicity and clarity and does not in itself dictate a relationship between the various embodiments and/or configurations discussed.

Training a Deep Neural Network (DNN) involves the forward propagation pass (or forward pass) and backward propagation pass (or backward pass). In the forward pass, one sample of input data is used as input for the first input layer and the output of each layer is passed on to subsequent layers to compute the loss function. In the backward pass, the loss function is passed from the last DNN layer to the first layer to compute the gradients of the DNN model parameters.

In some CML methods, the devices and server work in an alternating manner. For example, since a DNN consists of consecutive layers, the complete DNN is split into two parts at the granularity of layers, and a server partition is deployed on the server and a device partition is deployed on the devices. The devices train the initial layers of the DNN (the device partition) and the server trains the remaining layers (the server partition). First, a device runs the forward pass of the device partition on its local data. Next, the device sends the intermediate results (activations) to the server. Then, the server uses the activations to complete the forward pass of the server partition to obtain the loss. Next, the loss is then used for the backward pass on the server to compute the gradients of the parameters of the server partition and the gradients of the activations. Then, the server sends the gradients of the activations back to the device. Finally, the device computes the gradients of the parameters of the device partition in the device-side backward pass. In these methods, idle time on the device exists between the forward pass and the backward pass of the device partition. In at least some embodiments, the device performs the forward pass of the next few mini-batches during the device-side idle time to fill the pipeline.

In at least some embodiments, the following operations are performed for collaborative training with parallel operations. A DNN is divided into two parts and deploys them on the server and devices. Then, the forward and backward passes are reordered for multiple mini-batches. Each device executes the forward pass for multiple mini-batches in sequence. The immediate result of each forward pass (referred to as smashed data or activations) is transmitted to the server, which runs the forward and backward passes for the remaining layers and sends the gradients of the activations back to the device. The device then sequentially performs the backward passes for the mini-batches. The devices operate in parallel, and the local models are aggregated at a set frequency. Since the forward passes occur sequentially on the device, the communication for each forward pass overlaps the computation of the following forward passes. Also, the server and device computations occur simultaneously for different mini-batches. Thus, at least some embodiments reduce the idle time of devices and servers by overlapping server-side and device-side computations and server-device communication.

FIG. 1 is a schematic diagram of a system for collaborative training with parallel operations, according to at least some embodiments of the subject disclosure. The system includes a server 100, a plurality of computation devices 105A, 105B, 105C, and 105D, and a network 107.

Server 100 is computation device capable of performing calculations to train a neural network or other machine learning function. In at least some embodiments, server 100 includes a non-transitory computer-readable medium including instructions executable by a processor to cause the processor to perform training with parallel operations in collaboration with computation devices 105A, 105B, 105C, and 105D. In at least some embodiments, server 100 is a single server, a plurality of servers, a portion of a server, a virtual instance of cloud computing, etc. In at least some embodiments where server 100 is a plurality of servers or a plurality of virtual instances of cloud computing, server 100 includes a central server working with edge servers, each edge server having a logical location that is closer to the respective computation device among computation devices 105A, 105B, 105C, and 105D with which the edge server is in communication.

Computation devices 105A, 105B, 105C, and 105D are devices capable of performing calculations to train a neural network or other machine learning function. In at least some embodiments, computation devices 105A, 105B, 105C, and 105D each include a non-transitory computer-readable medium including instructions executable by a processor to cause the processor to perform training with parallel operations in collaboration with server 100. In at least some embodiments, computation devices 105A, 105B, 105C, and 105D are heterogeneous, meaning the devices have varying computation resources, such as processing power, memory, etc. In at least some embodiments, computation devices 105A, 105B, 105C, and 105D include devices having limited computation resources, such as smart watches, fitness trackers, Internet-of-Things (IoT) devices, etc., and/or devices having computation resources for a broader range of capabilities, such as smart phones, tablets, personal computers, etc. In at least some embodiments, computation devices 105A, 105B, 105C, and 105D receive private information, either by detecting it directly, such as through onboard microphones, cameras, etc., or by receiving data through electronic communication with another device, and use the private information as training data. In at least some embodiments, the training data is not private information or is a mixture of private and non-private information.

Computation devices 105A, 105B, 105C, and 105D are in communication with server 100 through network 107. In at least some embodiments, network 102 is configured to relay communication among server 100 and computation devices 105A, 105B, 105C, and 105D. In at least some embodiments, network 107 is a local area network (LAN), a wide area network (WAN), such as the internet, a radio access network (RAN), or any combination. In at least some embodiments, network 107 is a packet-switched network operating according to IPv4, IPv6 or other network protocol.

Figure 2:
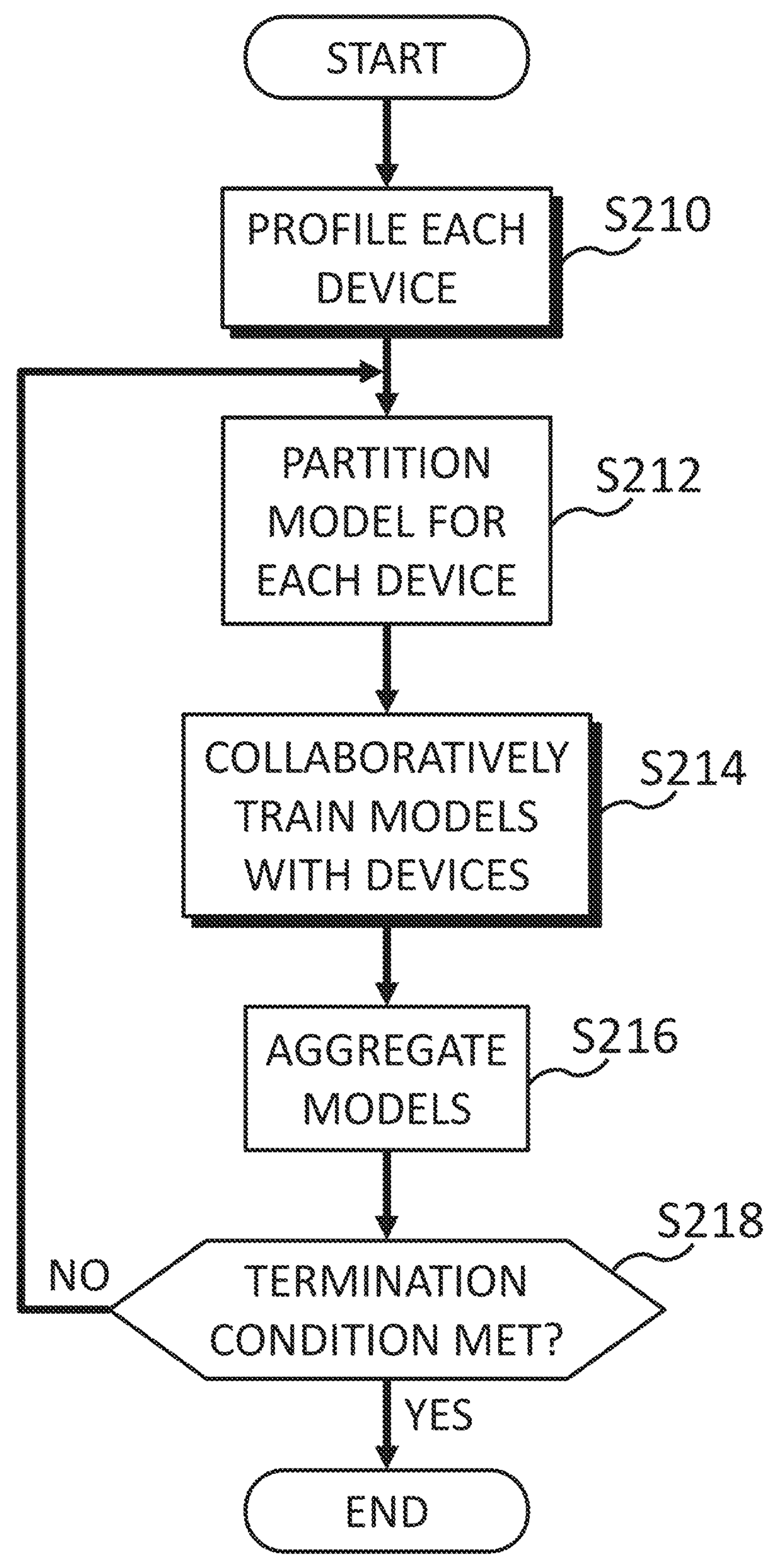
FIG. 2 is an operational flow for collaborative training with parallel operations, according to at least some embodiments of the subject disclosure.

FIG. 2 is an operational flow for collaborative training with parallel operations, according to at least some embodiments of the subject disclosure. The operational flow provides a method of collaborative training with parallel operations. In at least some embodiments, the method is performed by a controller of a server including sections for performing certain operations, such as the controller and server shown in FIG. 10, which will be explained hereinafter.

At S210, a profiling section profiles each computation device. In at least some embodiments, the profiling section profiles each computation device to estimate parameters for the collaborative training. In at least some embodiments, the profiling section performs the operational flow shown in FIG. 3, which will be explained hereinafter.

At S212, a partitioning section partitions a neural network model for each computation device. In at least some embodiments, the partitioning section partitions the plurality of layers of the neural network model into the device partition and the server partition based on the partition value. In at least some embodiments, the partitioning section partitions neural network model $M^k$ into a device partition $M^{c_k}$ and a server-side model $M^{s_k}$ represented as:

$$M^k = M^{s_k} \oplus M^{c_k} \quad \text{EQ. 1}$$

where the binary operator $\oplus$ stacks the layers of two partitions of a deep learning model as a complete model. In at least some embodiments, there are K pairs of $\{M^{c_k}, M^{s_k}\}$, one for each of K computation devices, where $M^{c_k}$ is deployed on computation device k while all of $M^{s_k}$ are deployed on the server. In at least some embodiments, the complete model $M^k$ contains Q layers, $M^{c_k}$ contains the initial P layers and $M^{s_k}$ contains the remaining layers, where $1 \leq P \leq Q$.

At S214, a training section collaboratively trains the neural network models with the computation devices. In at least some embodiments, the training section trains each instance of the neural network model collaboratively with a corresponding computation device among a plurality of computation devices. In at least some embodiments, the training section continuously updates the parameters, such as weights, of each instance of the neural network model for a number of rounds or until the parameters are satisfactory. In at least some embodiments, the training section performs, for each computation device, the operational flow shown in FIG. 5, which will be explained hereinafter.

At S216, an aggregating section aggregates the models collaboratively trained with the computation devices. In at least some embodiments, the aggregating section aggregates the updated parameters of neural network model instances received from the plurality of computation devices to generate an updated neural network model. In at least some embodiments, the aggregating section averages the gradient values across the neural network model instances, and calculates weight values of a global neural network model accordingly. In at least some embodiments, the aggregating section averages the weight values across the neural network model instances. In at least some embodiments, a global neural network model M is obtained by aggregating neural network model instances $M^k$ using the following algorithm:

$$M = \sum_{k=1}^{K} \frac{|D^k|}{\sum_{k=1}^{K} |D^k|} M^k \qquad \text{EQ. 2}$$

where $D^k$ is the local dataset on device k and $|\bullet|$ is the function to obtain the size of the given dataset. In at least some embodiments, an epoch of collaborative training is complete when the aggregating section generates the updated global neural network model.

At S218, the controller or a section thereof determines whether a termination condition has been met. In at least some embodiments, the termination condition is met when the model converges. In at least some embodiments, the termination condition is met after a predetermined number of epochs of collaborative training have been performed. In at least some embodiments, the termination condition is met when a time limit is exceeded. If the controller determines that the termination condition has not been met, then the operational flow returns to neural network model partitioning at S212. If the controller determines that the termination condition has been met, then the operational flow ends.

Figure 3:
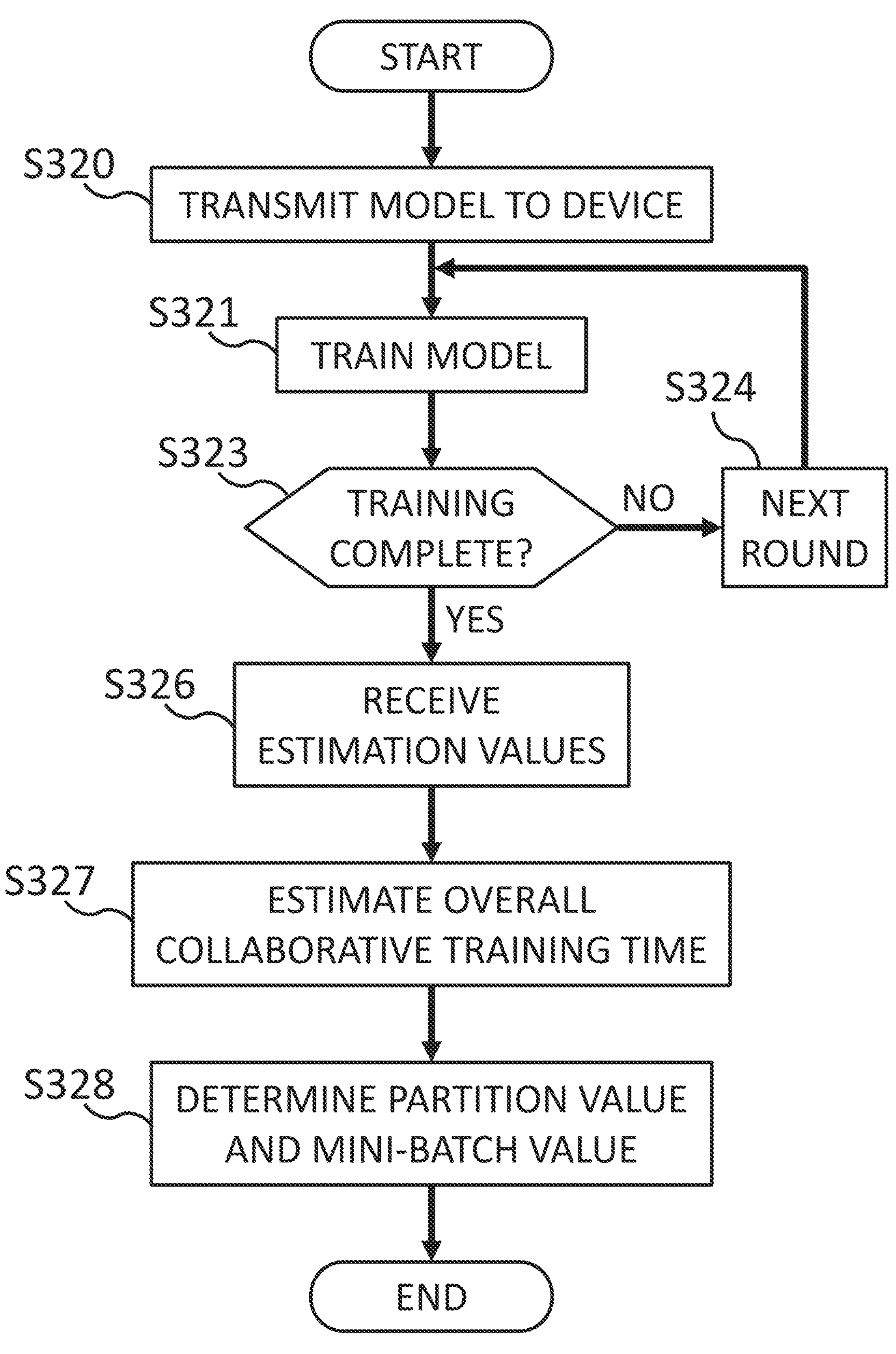
FIG. 3 is an operational flow of a server performing device profiling, according to at least some embodiments of the subject disclosure.

FIG. 3 is an operational flow of a server performing device profiling, according to at least some embodiments of the subject disclosure. The operational flow provides a method of device profiling by a server. In at least some embodiments, the operational flow is performed for each computation device among a plurality of computation devices. In at least some embodiments, the operational flow is performed in parallel for each computation device among the plurality of computation devices. In at least some embodiments, the method is performed by a profiling section of a server, such as the server shown in FIG. 10, which will be explained hereinafter.

At S320, the profiling section or a sub-section thereof transmits the model to the computation device. In at least some embodiments, the profiling section transmits the neural network model to the computation device.

At S321, the profiling section or a sub-section thereof trains the model. In at least some embodiments, the profiling section causes the training section to train the model. In at least some embodiments, the profiling section trains the neural network model for a number of rounds to identify the size of the output data and the training time for each layer of the neural network model. In at least some embodiments, $$t(\tilde{f}_q^{c_k})$$

represents a duration of time consumed by computation device k for activation computing of layer q in device partition $$M^{c_k}, t(\tilde{b}_q^{c_k})$$

represents a duration of time consumed by computation device k for gradient vector computing of layer q of device partition $$M^{c_k}, t(\tilde{f}_q^{s_k})$$

represents a duration of time consumed by the server for activation computing of layer q of server partition $M^{s_k}$, and $$t(\tilde{b}_q^{s_k})$$

represents a duration of time consumed by the server for gradient vector computing of layer q of server partition $M^{s_k}$, where $$\tilde{f}_q^{c_k}$$

represents a forward pass of layer q in device partition $M^{c_k}$ by computation device k, $$\tilde{b}_q^{c_k}$$

represents a backward pass of layer q in device partition $M^{c_k}$ by computation device $$k, \tilde{f}_q^{s_k}$$

represents a forward pass of layer q in server partition $M^{s_k}$ by the server, and $$\tilde{b}_q^{s_k}$$

represents a backward pass of layer q in server partition $M^{s_k}$ by the server. In at least some embodiments, $$\tilde{v}_q^f$$

represents the output data volume for a forward pass of layer q, and $$\tilde{v}_q^f$$

represents the output data volume for a backward pass of layer q. In at least some embodiments, the profiling section records values of $$t(\tilde{f}_q^{s_k}), t(\tilde{b}_q^{s_k}), \tilde{v}_q^f, \text{ and } \tilde{v}_q^f$$

during training of the neural network model.

At S323, the profiling section or a sub-section thereof determines whether training is complete. In at least some embodiments, the neural network model is trained for a predetermined number of rounds. If the profiling section determines that training is not complete, then the operational flow returns to model training at S321 for the next round (S324). If the profiling section determines that training is complete, then the operational flow proceeds to estimation value reception at S326.

At S326, the profiling section receives estimation values. In at least some embodiments, the profiling section receives a plurality of estimation values from the computation device. In at least some embodiments, the plurality of estimation values includes a plurality of device forward pass values and a plurality of device backward pass values. In at least some embodiments, each device forward pass value represents a duration of time consumed by the computation device for activation computing of a corresponding layer among the plurality of layers of the neural network model. In at least some embodiments, each device backward pass value represents a duration of time consumed by the computation device for gradient vector computing of a corresponding layer among the plurality of layers of the neural network model. In at least some embodiments, the profiling section receives values of $$t(\tilde{f}_q^{c_k}),$$

and $$t(\tilde{b}_q^{c_k})$$

computation device k.

At S327, the profiling section estimates overall collaborative training time. In at least some embodiments, the profiling section estimates an overall collaborative training value representing a duration of time for collaboratively training the neural network model with the computation device. In at least some embodiments, the profiling section estimates the overall collaborative training time by estimating each training stage by the following equations:

$$t(f_n^{c_k}) = \sum_{q=1}^{P^k} \frac{t(\tilde{f}_q^{c_k})}{N^k} \quad \text{EQ. 3}$$

$$t(f_n^{s_k}) = \sum_{q=P^k+1}^{Q} \frac{t(\tilde{f}_q^{s_k})}{N^k} \quad \text{EQ. 4}$$

$$t(b_n^{c_k}) = \sum_{q=1}^{P^k} \frac{t(\tilde{b}_q^{c_k})}{N^k} \quad \text{EQ. 5}$$

$$t(b_n^{s_k}) = \sum_{q=P^k+1}^{Q} \frac{t(\tilde{b}_q^{s_k})}{N^k} \quad \text{EQ. 6}$$

where $$f_n^{c_k}$$

represents the forward passes of $M^{c_k}$ by computation device k, $$f_n^{s_k}$$

represents the forward passes of $M^{s_k}$ by the server, $$b_n^{c_k}$$

represents the backward passes of $M^{c_k}$ by computation device k, and $$b_n^{s_k}$$

represents the backward passes of $M^{s_k}$ by the server for mini-batch n of N mini-batches in a round of collaborative training. In at least some embodiments, the time spent uploading and downloading between computation device k and the server is estimated by the following equations:

$$t(u_n^k) = \frac{\tilde{v}_{P^k}^f}{w_u^k N^k} \quad \text{EQ. 7}$$

$$t(d_n^k) = \frac{\tilde{v}_{P^k}^b}{w_d^k N^k} \quad \text{EQ. 8}$$

where $$u_n^k$$

represents uploading activations of mini-batch n from computation device k to the server and $$d_n^k$$

represents downloading gradient vectors of mini-batch n from the server to computation device $$k, w_u^k$$

represents the uplink bandwidth between computation device k and the server, $$w_d^k$$

represents the downlink bandwidth between computation device k and the server, $$\tilde{v}_{P^k}^f$$

represents the data volume for activations of layer $P^k$, and $$\hat{v}^b_{P^k}$$

represents the data volume for gradient vectors of layer $P^k$.

In at least some embodiments, the profiling section estimates the overall collaborative training time based on the training time of each round using dynamic programming with the following equations:

$$T\left(b_N^{c_k}\right) = t\left(b_N^{c_k}\right) + \max_{r \in prev\left(b_N^{c_k}\right)} T(r) \quad \text{EQ. 9}$$

$$T(r) = t(r) + \max_{r' \in prev(r)} T(r') \quad \text{EQ. 10}$$

$$T\left(f_1^{c_k}\right) = t\left(f_1^{c_k}\right) \quad \text{EQ. 11}$$

where $$f_1^{c_k}$$

represents the first stage, $$b_N^{c_k}$$

represents the last stage, prev(r) represents a function to obtain all stages previous to stage r according to TABLE I, T(r) represents the total time from the beginning of the training round to the end of the stage r, t(r) represents the time spent in stage r, and thus $$T\left(b_N^{c_k}\right)$$

represents the training time of each round.

TABLE I

| Stage | Previous Stages | Next Stages |
|---|---|---|
| $f_1^{c_k}$ | N/A | $f_2^{c_k}$, $u_1^k$ |
| $f_n^{c_k}$, 1 < n < N | $f_{n-1}^{c_k}$ | $f_{n+1}^{c_k}$, $u_n^k$ |
| $f_N^{c_k}$ | $f_{N-1}^{c_k}$ | $b_1^{c_k}$, $u_N^k$ |
| $u_1^k$ | $f_1^{c_k}$ | $u_2^k$, $f_1^{s_k}$ |
| $u_n^k$, 1 < n < N | $u_{n-1}^k$, $f_n^{c_k}$ | $u_{n+1}^k$, $f_n^{s_k}$ |
| $u_N^k$ | $u_{N-1}^k$, $f_N^{c_k}$ | $f_N^{s_k}$ |
| $f_1^{s_k}$ | $u_1^k$ | $b_1^{s_k}$ |
| $b_1^{s_k}$ | $f_1^{s_k}$ | $f_2^{s_k}$, $d_1^k$ |

TABLE I-continued

| Stage | Previous Stages | Next Stages |
|---|---|---|
| $f_n^{s_k}$, 1 < n < N | $u_n^k$, $b_{n-1}^{s_k}$ | $b_{n+1}^{s_k}$ |
| $b_n^{s_k}$, 1 < n < N | $f_n^{s_k}$ | $f_{n+1}^{s_k}$, $d_n^k$ |
| $f_N^{s_k}$ | $u_N^k$, $b_{N-1}^{s_k}$ | $b_N^{s_k}$ |
| $b_N^{s_k}$ | $f_N^{s_k}$ | $d_N^k$ |
| $d_1^k$ | $b_1^{s_k}$ | $d_2^k$, $b_1^{c_k}$ |
| $d_n^k$, 1 < n < N | $d_{n-1}^k$, $b_n^{s_k}$ | $d_{n+1}^k$, $b_n^{c_k}$ |
| $d_N^k$ | $d_{N-1}^k$, $b_N^{s_k}$ | $b_N^{c_k}$ |
| $b_1^{c_k}$ | $f_N^{c_k}$, $d_1^k$ | $b_2^{c_k}$ |
| $b_n^{c_k}$, 1 < n < N | $b_{n-1}^{c_k}$, $d_n^k$ | $b_{n+1}^{c_k}$ |
| $b_N^{c_k}$ | $b_{N-1}^{c_k}$, $d_N^k$ | N/A |

At S328, the profiling section determines a partition value and a mini-batch value. In at least some embodiments, the profiling section determines the partition value and the mini-batch value based on the estimating. In at least some embodiments, the profiling section estimates the overall collaborative training value is based on the plurality of device forward pass values, the plurality of device forward pass values, a plurality of activation volume values, a plurality of gradient vector volume values, an uplink bandwidth value, a downlink bandwidth value, a partition value representing the number of layers of the device partition, and a mini-batch value representing the number of mini-batches in the plurality of mini-batches. In at least some embodiments, each activation volume value represents a volume of data output by activation computing of a corresponding layer among the plurality of layers of the neural network model. In at least some embodiments, each gradient vector volume value represents a volume of data output by gradient vector computing of a corresponding layer among the plurality of layers of the neural network model. In at least some embodiments, the uplink bandwidth value represents an uplink bandwidth between the device and the server. In at least some embodiments, the downlink bandwidth value represents a downlink bandwidth between the device and the server. In at least some embodiments, the profiling section estimates the overall collaborative training value for each pair among a plurality of pairs of values $N^k$ and $P^k$. In at least some embodiments, the range of $P^k$ is $\{P^k | 1 \leq P^k \leq Q, P^k \in \mathbb{Z}^+\}$ where $\mathbb{Z}^+$ is the set of all positive integers. In at least some embodiments, the profiling section estimates the parallel batch number N using the following equation:

$$N^k = 1 + \left\lceil \frac{t\left(u_n^k\right) + t\left(f_n^{s_k}\right) + t\left(b_n^{s_k}\right) + t\left(d_n^k\right)}{\min\left\{t\left(f_n^{c_k}\right), t\left(b_n^{c_k}\right)\right\}} \right\rceil = \quad \text{EQ. 12}$$

-continued $$1+\left\lceil\frac{\frac{\tilde{v}^f_{P^k}}{w^k_u N^k}+\sum_{q=P^k+1}^{Q}\frac{t(\tilde{f}^s_q)}{N^k}+\sum_{q=P^k+1}^{Q}\frac{t(\tilde{b}^s_q)}{N^k}+\frac{\tilde{v}^b_{P^k}}{w^k_d N^k}}{\min\left\{\sum_{q=1}^{P^k}\frac{t(\tilde{f}^{c_k}_q)}{N^k},\sum_{q=1}^{P^k}\frac{t(\tilde{b}^{c_k}_q)}{N^k}\right\}}\right\rceil=$$

$$1+\left\lceil\frac{\frac{\tilde{v}^f_{P^k}}{w^k_u}+\sum_{q=P^k+1}^{Q}t(\tilde{f}^s_q)+\sum_{q=P^k+1}^{Q}t(\tilde{b}^s_q)+\frac{\tilde{v}^b_{P^k}}{w^k_d}}{\min\left\{\sum_{q=1}^{P^k}t(\tilde{f}^{c_k}_q),\sum_{q=1}^{P^k}t(\tilde{b}^{c_k}_q)\right\}}\right\rceil.$$

In at least some embodiments, the profiling section determines which pair to us based on the pair that yields the least overall collaborative training value. In at least some embodiments, the profiling section shortlists candidate pairs of $N^k$ and $P^k$.

Figure 4:
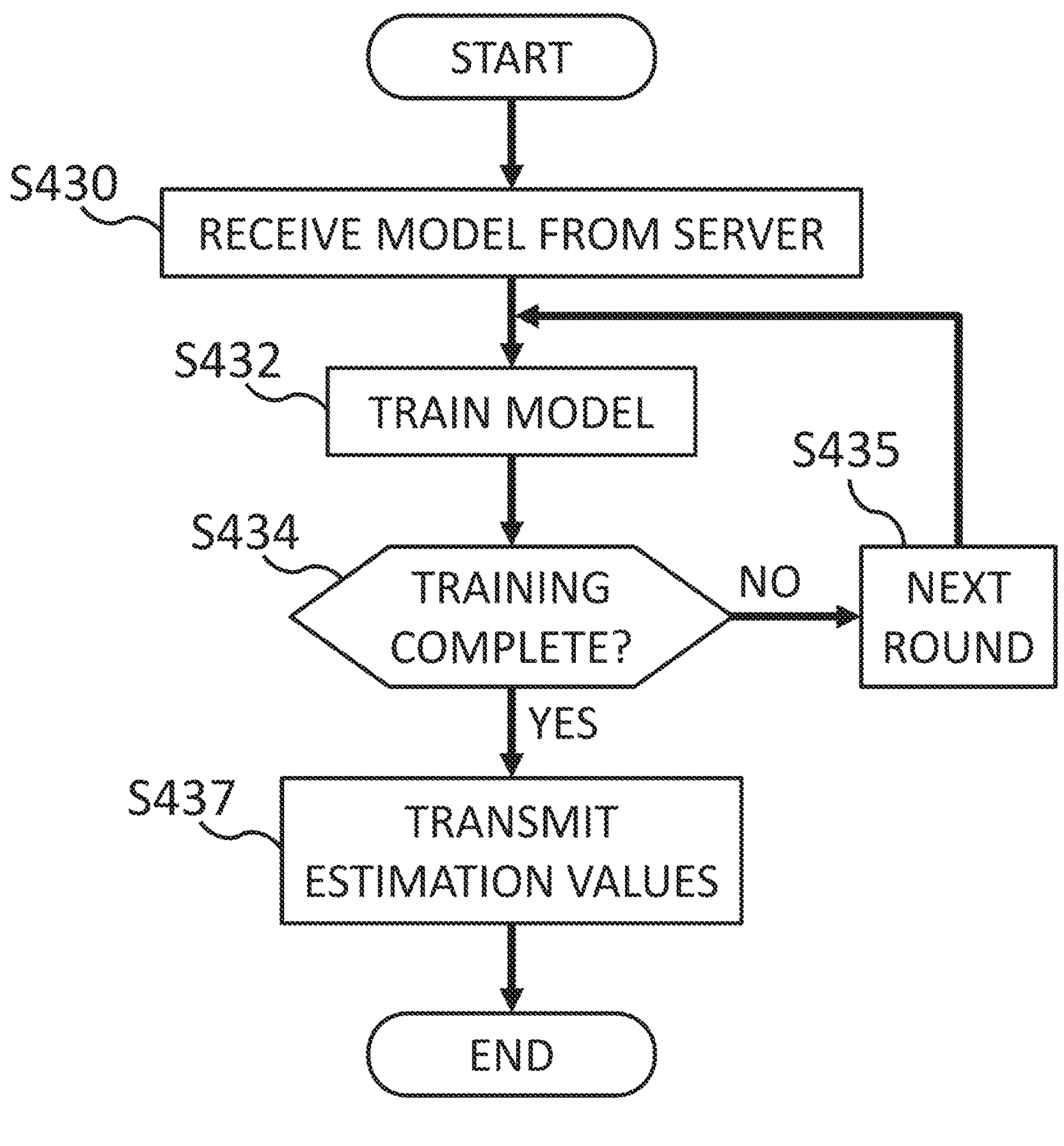
FIG. 4 is an operational flow of a computation device performing device profiling, according to at least some embodiments of the subject disclosure.

FIG. 4 is an operational flow of a computation device performing device profiling, according to at least some embodiments of the subject disclosure. The operational flow provides a method of device profiling by a computation device. In at least some embodiments, the operational flow is performed by each computation device among a plurality of computation devices. In at least some embodiments, the operational flow is performed in parallel by each computation device among the plurality of computation devices.

At S430, the computation device receives a model from the server. In at least some embodiments, the computation device receives a neural network model from the server.

At S432, the computation device trains the model. In at least some embodiments, the computation device trains the neural network model for a number of rounds to identify the training time for each layer of the neural network model. In at least some embodiments, the computation device records values of $$t(\tilde{f}^{c_k}_q)$$

and t $$t(\tilde{b}^{c_k}_q),$$

during training of the neural network model.

At S434, the computation device determines whether training is complete. In at least some embodiments, the neural network model is trained for a predetermined number of rounds. If the computation device determines that training is not complete, then the operational flow returns to model training at S432 for the next round (S435). If the computation device determines that training is complete, then the operational flow proceeds to estimation value transmission at S437.

At S437, the computation device transmits estimation values. In at least some embodiments, the computation device transmits a plurality of estimation values to the server. In at least some embodiments, the plurality of estimation values includes a plurality of device forward pass values and a plurality of device backward pass values. In at least some embodiments, computation device k transmits values of $$t(\tilde{f}^{c_k}_q)$$

and $$t(\tilde{b}^{c_k}_q)$$

to the server.

Figure 5:
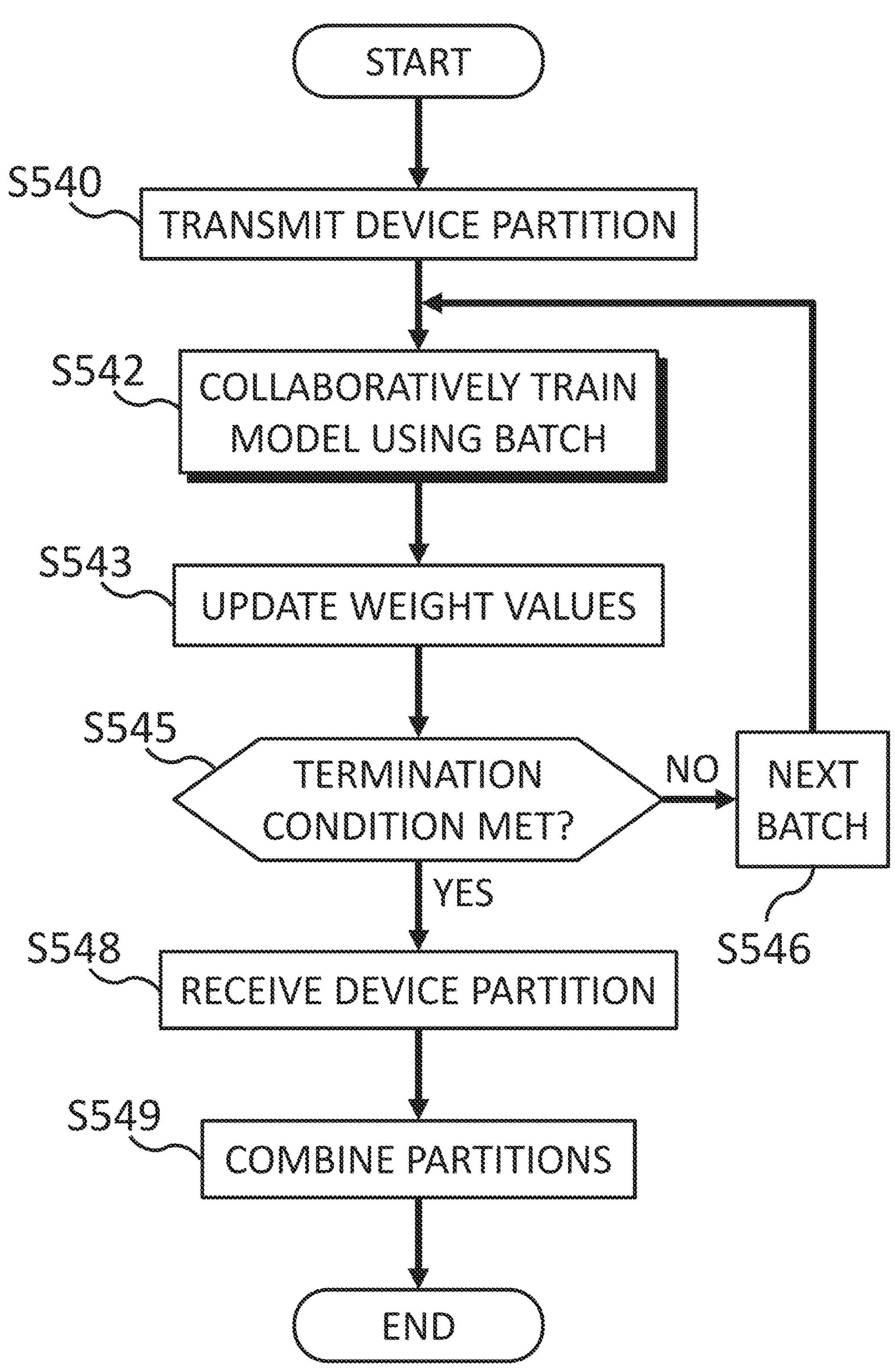
FIG. 5 is an operational flow for an epoch of training in collaboration with a computation device, according to at least some embodiments of the subject disclosure.

FIG. 5 is an operational flow for an epoch of training in collaboration with a computation device, according to at least some embodiments of the subject disclosure. The operational flow provides a method of training in collaboration with one computation device for one epoch. In at least some embodiments, the operational flow is performed for each computation device among a plurality of computation devices. In at least some embodiments, the operational flow is performed in parallel for each computation device among the plurality of computation devices. In at least some embodiments, the method is performed by a training section of a server, such as the server shown in FIG. 10, which will be explained hereinafter.

At S540, the training section or a sub-section thereof transmits the device partition. In at least some embodiments, the training section transmitting, before the training, the device partition to the computation device. In at least some embodiments, the training section transmits device partition $M^{c_k}$ to computation device k.

At S542, the training section or a sub-section thereof collaboratively trains the model using a batch of data samples. In at least some embodiments, the training section trains, collaboratively with a computation device through a network, a neural network model. In at least some embodiments, the training section trains server partition $M^{s_k}$ while computation device k trains device partition $M^{c_k}$. In at least some embodiments, the training section performs the operational flow shown in FIG. 8, which will be explained hereinafter.

At S543, the training section or a sub-section thereof updates the weight values. In at least some embodiments, the training section updates, after the training, the weight values of the server partition based on a set of gradient vectors for each layer of the server partition computed during each of a first plurality of consecutive time periods during the training. In at least some embodiments, the training section updates the parameters of server partition $M^{s_k}$ at the end of the training round. In at least some embodiments, as iterations of S542 and S543 proceed, the training section performs a plurality of iterations of the training and the updating the weight values to produce updated server partition $M^{s_k\prime}$.

At S545, the training section or a sub-section thereof determines whether a termination condition has been met. In at least some embodiments, the training section does not stop training server partition $M^{s_k}$ until a “stop epoch” signal is received from computation device k. If the training section determines that the termination condition has not been met, then the operational flow returns to collaborative training at S542 for collaborative training using the next batch (S546). If the profiling section determines that the termination condition has been met, then the operational flow proceeds to device partition reception at S548.

At S548, the training section or a sub-section thereof receives the device partition. In at least some embodiments, the training section receives the device partition from the computation device. In at least some embodiments, the training section receives updated device partition $M^{c_k'}$ from computation device k.

At S549, the training section or a sub-section thereof combines partitions. In at least some embodiments, the training section combining the device partition with the server partition to obtain an updated neural network model. In at least some embodiments, the training section combines updated device partition $M^{c_k'}$ from computation device k with updated server partition $M^{s_k'}$ to produce an updated model $M^{k'}$.

Figure 6:
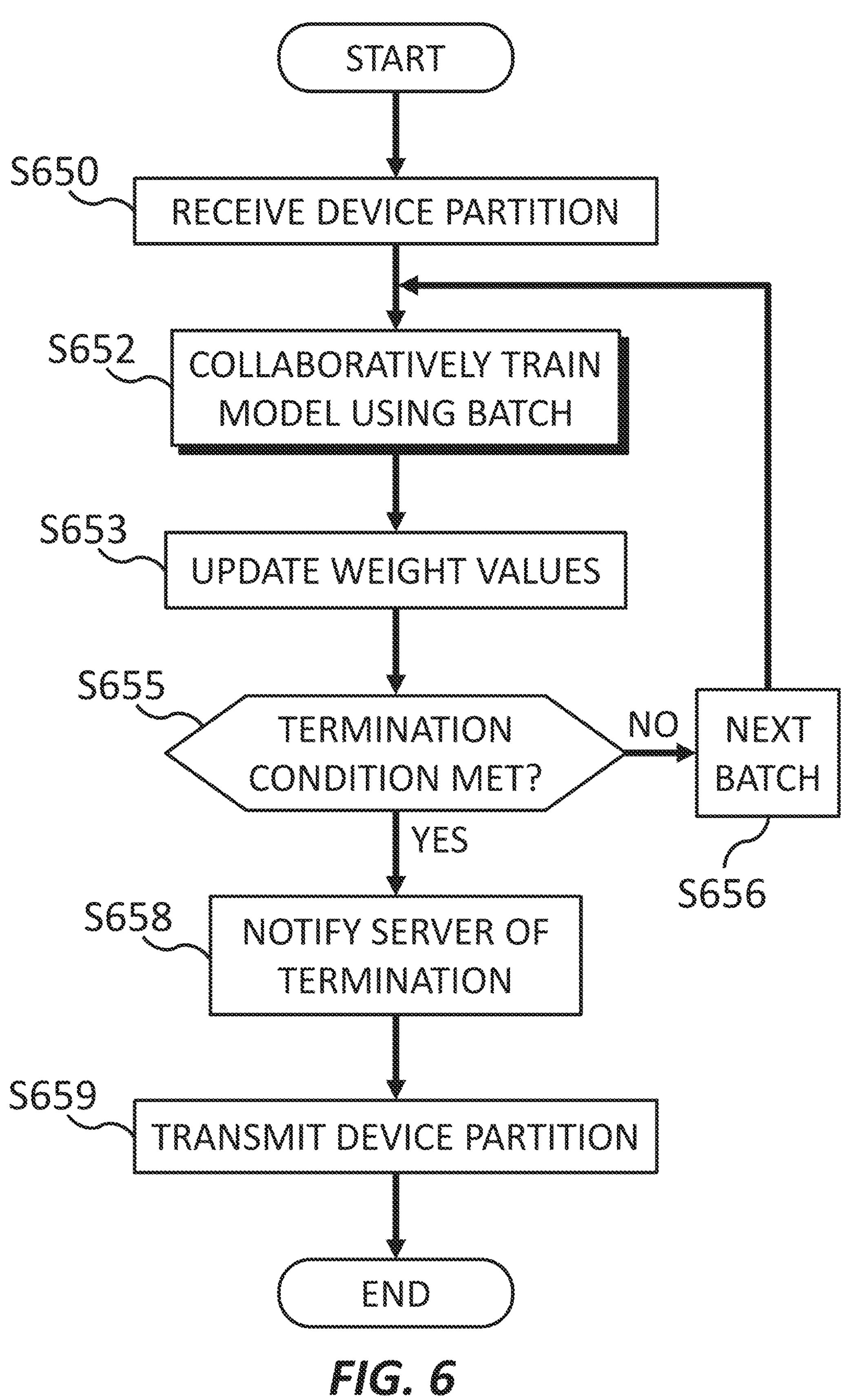
FIG. 6 is an operational flow for an epoch of training in collaboration with a server, according to at least some embodiments of the subject disclosure.

FIG. 6 is an operational flow for an epoch of training in collaboration with a server, according to at least some embodiments of the subject disclosure. The operational flow provides a method of training by one computation device in collaboration with the server for one epoch. In at least some embodiments, the operational flow is performed for each computation device among a plurality of computation devices. In at least some embodiments, the operational flow is performed in parallel for each computation device among the plurality of computation devices.

At S650, the computation device receives a device partition. In at least some embodiments, the computation device receives, from the server, a device partition of a neural network model, the neural network model including a plurality of layers partitioned into the device partition and a server partition. In at least some embodiments, computation device k receives device partition $M^{c_k}$ from the server.

At S652, the computation device collaboratively trains the model using a batch of data samples. In at least some embodiments, the computation device trains, collaboratively with a server through a network, a neural network model. In at least some embodiments, computation device k trains device partition $M^{c_k}$ while the server trains server partition $M^{s_k}$. In at least some embodiments, the computation device performs the operational flow shown in FIG. 9, which will be explained hereinafter.

At S653, the computation device updates the weight values. In at least some embodiments, the computation device updates, after the training, the weight values of the device partition based on the set of gradient vectors for each layer of the device partition computed during each of the second plurality of consecutive time periods during the training. In at least some embodiments, computation device k updates the parameters of device partition $M^{c_k}$ at the end of the training round. In at least some embodiments, as iterations of S652 and S653 proceed, the computation device performs a plurality of iterations of the training and the updating the weight values to produce updated device partition $M^{c_k'}$.

At S655, the computation device determines whether a termination condition has been met. In at least some embodiments, the termination condition is met when collaborative training has been performed using a predetermined number of batches. In at least some embodiments, the termination condition is met when collaborative training has been performed for a predetermined amount of time. If the computation device determines that the termination condition has not been met, then the operational flow returns to collaborative training at S652 for collaborative training using the next batch (S656). If the computation device determines that the termination condition has been met, then the operational flow proceeds to server notification at S658.

At S658, the computation device notifies the server of termination of the round of collaborative training. In at least some embodiments, the computation device transmits a "stop epoch" signal to the server.

At S659, the computation device transmits the device partition to the server. In at least some embodiments, the computation device transmits the device partition to the server. In at least some embodiments, computation device k transmits updated device partition $M^{c_k'}$ to the server.

Figure 7:
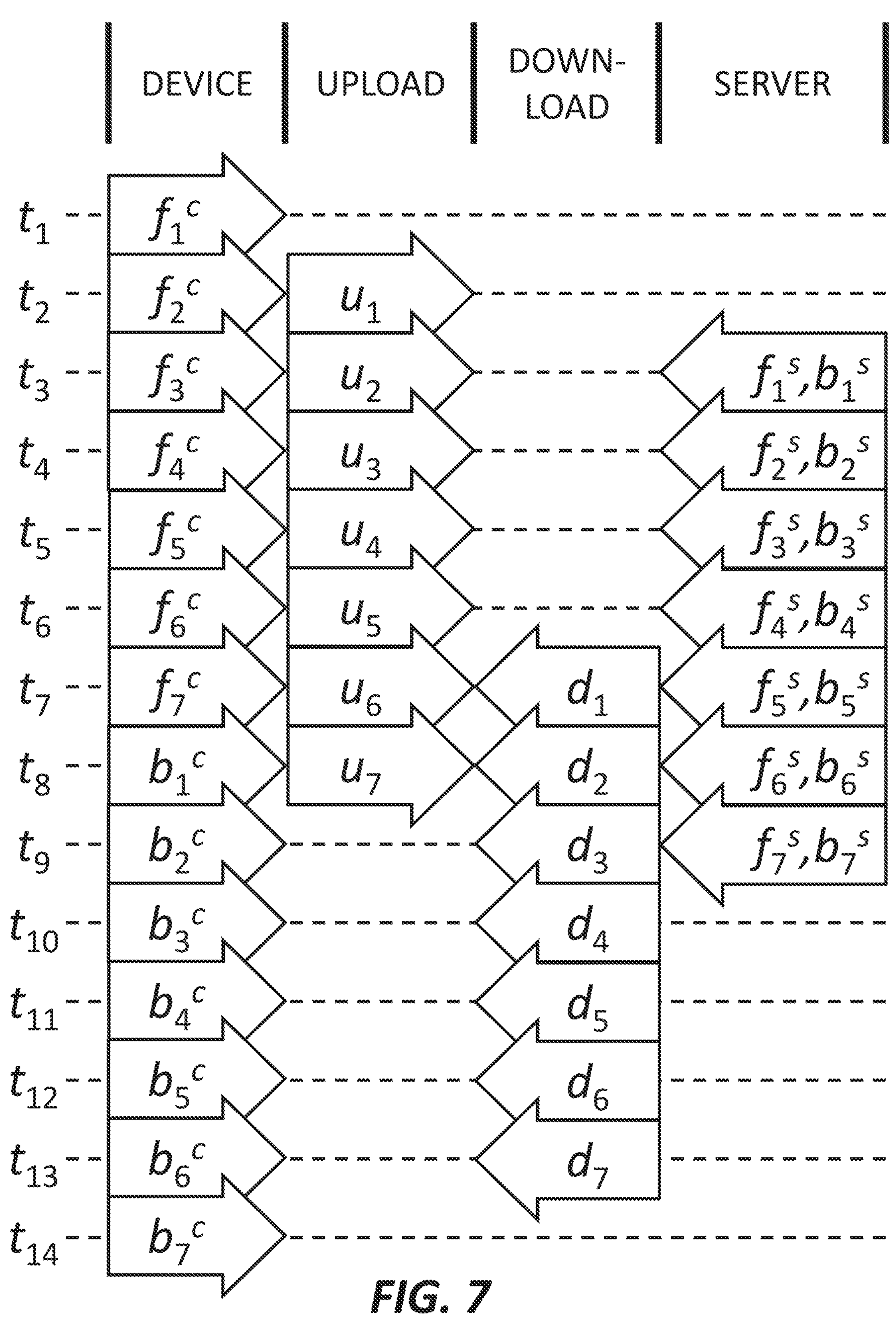
FIG. 7 is an operational and communication flow of a computation device and server collaboratively training a neural network model using a batch of data samples, according to at least some embodiments of the subject disclosure.

FIG. 7 is an operational and communication flow of a computation device and server collaboratively training a neural network model using a batch of data samples, according to at least some embodiments of the subject disclosure. The operational and communication flow includes a plurality of consecutive time periods $t_1$-$t_{14}$.

In at least some embodiments, from the perspective of the computation device, the plurality of consecutive time periods includes a first plurality of consecutive time periods $t_2$-$t_7$ and a second plurality of consecutive time periods $t_8$-$t_{13}$. During time periods $t_2$-$t_7$, the computation device applies a device partition to a mini-batch of data samples to obtain a set of activations, and transmits a set of activations obtained during a preceding time period. During time periods $t_8$-$t_{13}$, the computation device receives a set of gradient vectors and a set of loss values, and computes a set of gradient vectors based on a set of gradient vectors received during a preceding time period.

For example, during time period $t_2$, the computation device performs operation $$f_2^c$$

by applying a device partition of a neural network model, the neural network model including a plurality of layers partitioned into the device partition and a server partition, to each data sample among a current set of data samples to obtain a current set of activations, and performs operation $u_1$ by transmitting, to the server, a preceding set of activations of a layer bordering the server partition (output of $$f_1^c$$

) obtained during a preceding time period ($t_1$) among any of the first plurality of consecutive time periods.

For example, during time period $t_8$, the computation device performs operation $d_2$ by receiving, from the server, a current set of gradient vectors of a layer of the server partition bordering the device partition (output of $$b_1^s)$$

) and a current set of loss values (output of $$f_1^s)$$

) of a loss function relating activations to output instances, and performs operation $$b_1^c$$

by computing a set of gradient vectors for each layer of the device partition, based on a preceding set of gradient vectors of the layer of the server partition bordering the device partition and a preceding set of loss values, the preceding set of gradient vectors and the preceding set of loss values received (by $d_1$) during a preceding time period ($t_7$) among any of the first plurality of consecutive time periods and the second plurality of consecutive time periods.

In at least some embodiments, during each of the first plurality of consecutive time periods, the operation of applying the device partition consumes a duration of time substantially similar to a duration of time consumed by the operation of transmitting the preceding set of activations of the layer bordering the server partition. In at least some embodiments, during each of the second plurality of consecutive time periods, the operation of receiving the current set of gradient vectors of the layer of the server partition bordering the device partition and the current set of loss values consumes a duration of time substantially similar to a duration of time consumed by the operation of computing the set of gradient vectors for each layer of the device partition.

In at least some embodiments, from the perspective of the computation device, the first plurality of consecutive time periods immediately precedes the second plurality of consecutive time periods.

In at least some embodiments, from the perspective of the server, the plurality of consecutive time periods includes a first plurality of consecutive time periods $t_3$-$t_8$ and a second plurality of consecutive time periods $t_7$-$t_{13}$. During time periods $t_3$-$t_8$, the server receives a set of activations, applies the server partition to a set of activations, applies a set of output instances to a loss function, and computes a set of gradient vectors. During time periods $t_7$-$t_{13}$, the server transmits a set of gradient vectors.

For example, during time period $t_3$, the server performs operation $u_2$ by receiving, from the computation device, a current set of activations (output of $$f_2^c$$

output from a device partition of a neural network model, the neural network model including a plurality of layers partitioned into the device partition and a server partition, performs operation $$f_1^s$$

by applying the server partition to each activation among a preceding set of activations to obtain a current set of output instances, the preceding set of activations received (by $u_1$) during a preceding time period ($t_2$) among the first plurality of consecutive time periods and applying each output instance among the current set of output instances to a loss function relating activations to output instances to obtain a current set of loss values, and performs operation $$b_1^s$$

by computing a set of gradient vectors for each layer of the server partition, including a current set of gradient vectors of a layer bordering the device partition, based on the current set of loss values (output of $$f_1^s$$

).

For example, during time period $t_7$, the server performs operation $$f_1^s$$

by transmitting, to the computation device, a preceding set of gradient vectors of the layer bordering the device partition computed during a preceding time period ($t_3$) among any of the first plurality of consecutive time periods and the second plurality of consecutive time periods and a preceding set of loss values of the loss function obtained in the preceding time period ($t_3$) among any of the first plurality of consecutive time periods and the second plurality of consecutive time periods.

In at least some embodiments, from the perspective of the server, the first plurality of consecutive time periods overlaps with the second plurality of consecutive time periods, such that the operations of both the first plurality of consecutive time periods and the second plurality of consecutive time periods are performed in at least two consecutive time periods among both the first plurality of consecutive time periods and the second plurality of consecutive time periods. For example, the server performs operations $u_6$, $d_1$, $$f_5^s$$

, and $$b_5^s$$

during time period $t_7$, and performs operations $u_7$, $d_2$, $$f_6^s,$$

and $$b_6^s$$

during time period $t_8$.

Although FIG. 7 shows an operational and communication flow where there are seven mini-batches, in other embodiments, other numbers of mini-batches are used.

Figure 8:
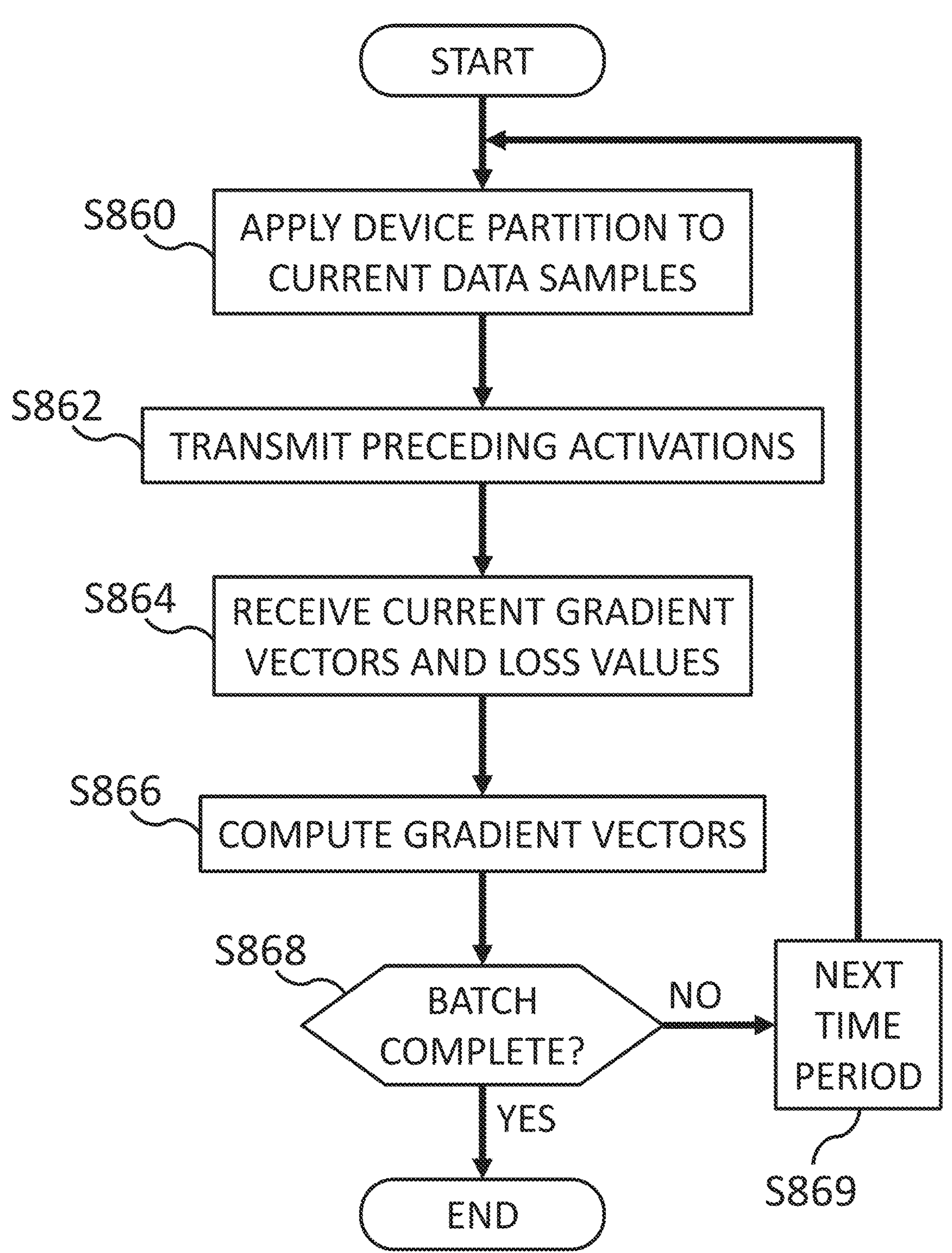
FIG. 8 is an operational flow for training a neural network model using a batch of data samples in collaboration with a server, according to at least some embodiments of the subject disclosure.

FIG. 8 is an operational flow for training a neural network model using a batch of data samples in collaboration with a server, according to at least some embodiments of the subject disclosure. The operational flow provides a method of training a neural network model by one computation device using a batch of data samples in collaboration with a server. In at least some embodiments, the operational flow is performed for each computation device among a plurality of computation devices. In at least some embodiments, the operational flow is performed in parallel for each computation device among the plurality of computation devices.

Each iteration of the operational flow represents one time period among consecutive time periods. However, not every operation is performed in every consecutive time period as is explained above.

At S860, the computation device applies a device partition to current data samples. In at least some embodiments, the computation device applies a device partition of a neural network model, the neural network model including a plurality of layers partitioned into the device partition and a server partition, to each data sample among a current set of data samples to obtain a current set of activations. In at least some embodiments, during the transmitting of each of the second plurality of consecutive time periods, the computation device also transmits a current set of labels to the server. The operation at S860 is substantially similar to operations $$f_1^c - f_7^c,$$

performed during time periods $t_1$-$t_7$.

At S862, the computation device transmits a preceding set of activations. In at least some embodiments, the computation device transmits, to the server, a preceding set of activations of a layer bordering the server partition obtained during a preceding time period among any of the first plurality of consecutive time periods. The operation at S862 is substantially similar to operations $u_1$-$u_7$, performed during time periods $t_2$-$t_8$.

At S864, the computation device receives a current set of gradient vectors and loss values. In at least some embodiments, the computation device receives, from the server, a current set of gradient vectors of a layer of the server partition bordering the device partition and a current set of loss values of a loss function relating activations to output instances. The operation at S864 is substantially similar to operations $d_1$-$d_7$, performed during time periods $t_7$-$t_{13}$.

At S866, the computation device computes a set of gradient vectors. In at least some embodiments, the computation device computes a set of gradient vectors for each layer of the device partition, based on a preceding set of gradient vectors of the layer of the server partition bordering the device partition and a preceding set of loss values, the preceding set of gradient vectors and the preceding set of loss values received during a preceding time period among any of the first plurality of consecutive time periods and the second plurality of consecutive time periods. The operation at S866 is substantially similar to operations $$b_1^c - b_7^c,$$

performed during time periods $t_8$-$t_{14}$.

At S868, the computation device determines whether the batch is complete. In at least some embodiments, each set of data samples corresponds to a mini-batch of data samples, wherein a batch of data samples includes a number of mini-batches. In at least some embodiments, the device partition is applied to each data sample in the batch once during training. If the computation device determines that the batch is incomplete, then the operational flow returns for another iteration of applicable operations in the next time period (S869). If the computation device determines that the batch is complete, then the operational flow ends.

Figure 9:
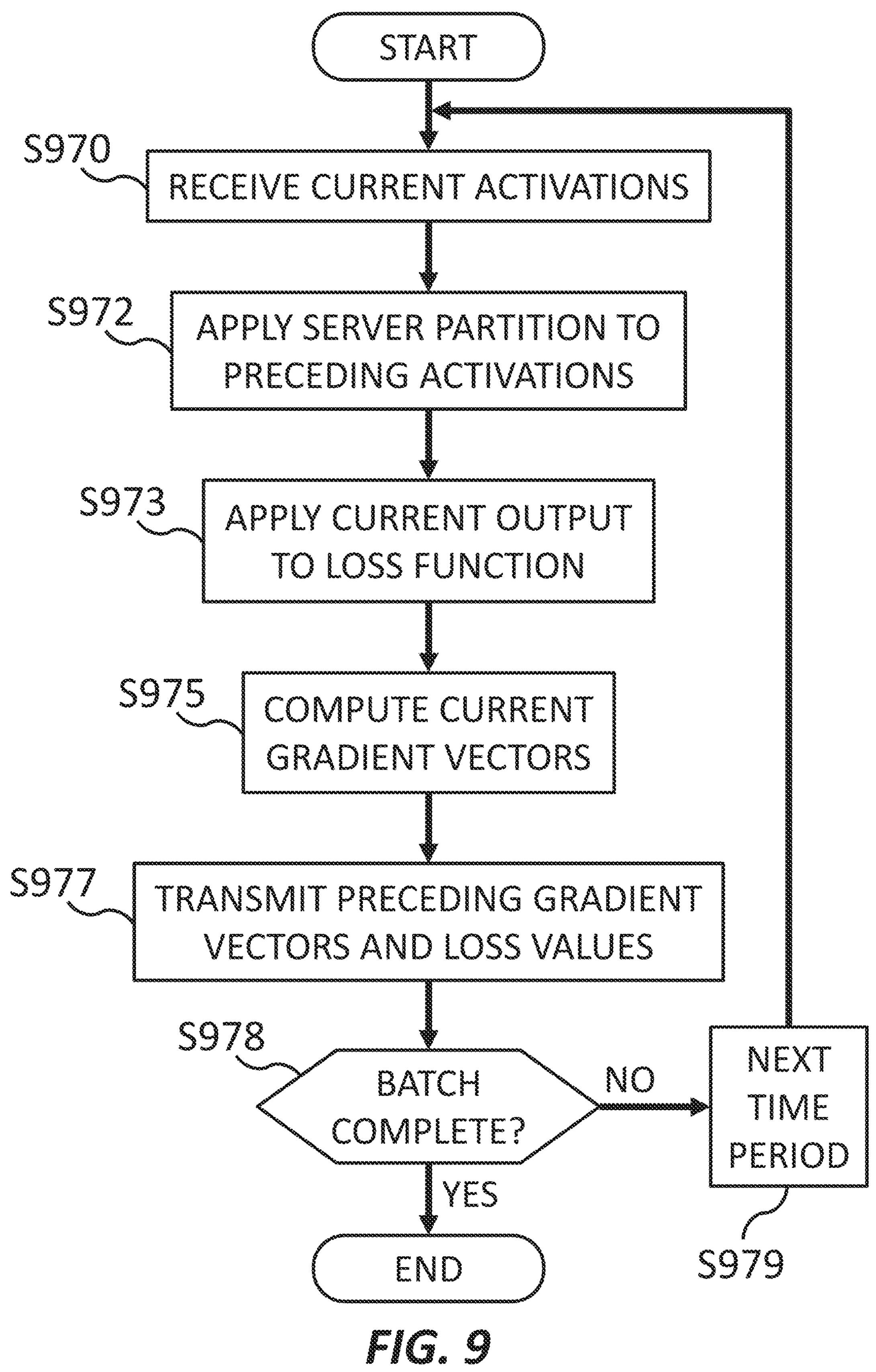
FIG. 9 is an operational flow for training a neural network model using a batch of data samples in collaboration with a computation device, according to at least some embodiments of the subject disclosure.

FIG. 9 is an operational flow for training a neural network model using a batch of data samples in collaboration with a computation device, according to at least some embodiments of the subject disclosure. The operational flow provides a method of training a neural network model using a batch of data samples in collaboration with one computation device. In at least some embodiments, the operational flow is performed for each computation device among a plurality of computation devices. In at least some embodiments, the operational flow is performed in parallel for each computation device among the plurality of computation devices. In at least some embodiments, the method is performed by a training section of a server, such as the server shown in FIG. 10, which will be explained hereinafter.

Each iteration of the operational flow represents one time period among consecutive time periods. However, not every operation is performed in every consecutive time period as is explained above.

At S970, the training section or a sub-section thereof receives a current set of activations. In at least some embodiments, the training section receives, from the computation device, a current set of activations output from a device partition of a neural network model, the neural network model including a plurality of layers partitioned into the device partition and a server partition. In at least some embodiments, during the receiving, the training section also receives a current set of labels from the computation device. The operation at S970 is substantially similar to operations $u_1$-$u_7$, performed during time periods $t_2$-$t_8$.

At S972, the training section or a sub-section thereof applies the server partition to a preceding set of activations. In at least some embodiments, the training section applies the server partition to each activation among a preceding set of activations to obtain a current set of output instances, the preceding set of activations received during a preceding time period among the first plurality of consecutive time periods.

At S974, the training section or a sub-section thereof applies the current set of output instances to a loss function. In at least some embodiments, the training section applies each output instance among the current set of output instances to a loss function relating activations to output instances to obtain a current set of loss values. The operations at S972 and S974 are substantially similar to operations $$f_1^s - f_7^s,$$

performed during time periods $t_3$-$t_9$.

At S975, the training section or a sub-section thereof computes a current set of gradient vectors. In at least some embodiments, the training section computes a set of gradient vectors for each layer of the server partition, including a current set of gradient vectors of a layer bordering the device partition, based on the current set of loss values. The operation at S975 is substantially similar to operations $$b_1^s - b_7^s,$$

performed during time periods $t_3$-$t_9$.

At S977, the training section or a sub-section thereof transmits a preceding set of gradient vectors and loss values. In at least some embodiments, the training section transmits, to the computation device, a preceding set of gradient vectors of the layer bordering the device partition computed during a preceding time period among any of the first plurality of consecutive time periods and the second plurality of consecutive time periods and a preceding set of loss values of the loss function obtained in the preceding time period among any of the first plurality of consecutive time periods and the second plurality of consecutive time periods. The operation at S977 is substantially similar to operations $d_1$-$d_7$, performed during time periods $t_7$-$t_{13}$.

At S978, the training section determines whether the batch is complete. In at least some embodiments, each set of activations corresponds to a mini-batch of data samples, wherein a batch of data samples includes a number of mini-batches. In at least some embodiments, the server partition is applied to the activation corresponding to each data sample in the batch once during the training. If the training section determines that the batch is incomplete, then the operational flow returns for another iteration of applicable operations in the next time period (S979). If the training section determines that the batch is complete, then the operational flow ends.

Figure 10:
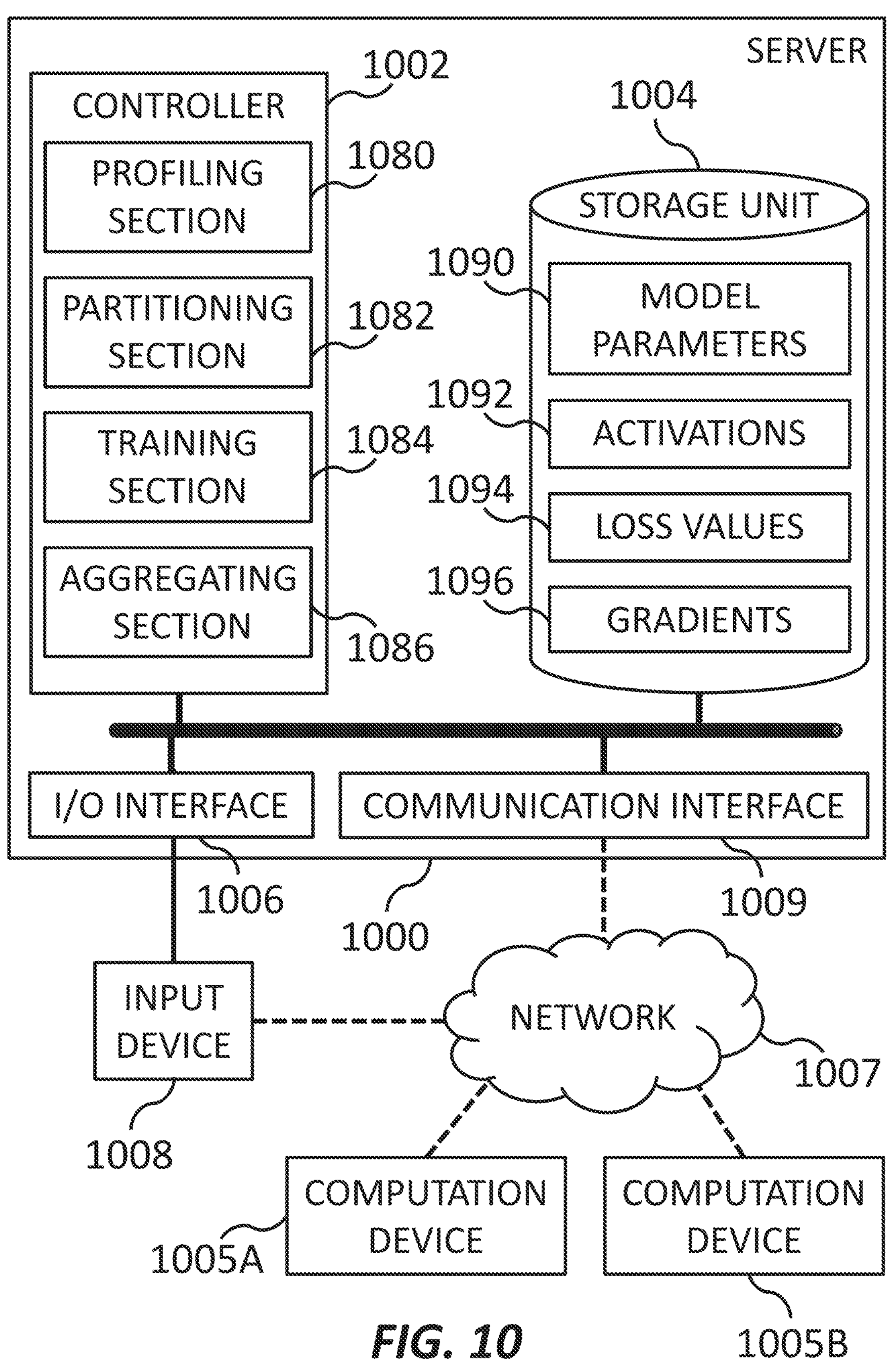
FIG. 10 is a block diagram of a hardware configuration for collaborative training with parallel operations, according to at least some embodiments of the subject disclosure.

FIG. 10 is a block diagram of a hardware configuration for collaborative training with parallel operations, according to at least some embodiments of the subject disclosure.

The exemplary hardware configuration includes server 1000, which interacts with input device 1008, and communicates with computation devices 1005A and 1005B through network 1007. In at least some embodiments, server 1000 is a computer or other computing device that receives input or commands from input device 1008. In at least some embodiments, server 1000 is integrated with input device 1008. In at least some embodiments, server 1000 is a computer system that executes computer-readable instructions to perform operations for embedded milestone status.

Server 1000 includes a controller 1002, a storage unit 1004, an input/output interface 1006, and a communication interface 1009. In at least some embodiments, controller 1002 includes a processor or programmable circuitry executing instructions to cause the processor or programmable circuitry to perform operations according to the instructions. In at least some embodiments, controller 1002 includes analog or digital programmable circuitry, or any combination thereof. In at least some embodiments, controller 1002 includes physically separated storage or circuitry that interacts through communication. In at least some embodiments, storage unit 1004 includes a non-volatile computer-readable medium capable of storing executable and non-executable data for access by controller 1002 during execution of the instructions. Communication interface 1009 transmits and receives data from network 1007. Input/output interface 1006 connects to various input and output units, such as input device 1008, via a parallel port, a serial port, a keyboard port, a mouse port, a monitor port, and the like to accept commands and present information. In some embodiments, storage unit 1004 is external from server 1000.

Controller 1002 includes profiling section 1080, partitioning section 1082, training section 1084, and aggregating section 1086. Storage unit 1004 includes model parameters 1090, activations 1092, loss values 1094, and gradients 1096.

Profiling section 1080 is the circuitry or instructions of controller 1002 configured to profile computation devices. In at least some embodiments, profiling section 1080 is configured to profile each computation device to estimate parameters for collaborative training. In at least some embodiments, profiling section 1080 records information in storage unit 1004. In at least some embodiments, profiling section 1080 includes sub-sections for performing additional functions, as described in the foregoing flow charts. In at least some embodiments, such sub-sections is referred to by a name associated with a corresponding function.

Partitioning section 1082 is the circuitry or instructions of controller 1002 configured to partition neural network models. In at least some embodiments, partitioning section 1082 is configured to partition the plurality of layers of the neural network model into the device partition and the server partition based on the partition value. In at least some embodiments, partitioning section 1082 utilizes information in storage unit 1004, such as model parameters 1090. In at least some embodiments, partitioning section 1082 includes sub-sections for performing additional functions, as described in the foregoing flow charts. In at least some embodiments, such sub-sections is referred to by a name associated with a corresponding function.

Training section 1084 is the circuitry or instructions of controller 1002 configured to train neural network models. In at least some embodiments, training section 1084 is configured to train, collaboratively with plurality of computation devices through a network, a neural network model. In at least some embodiments, training section 1084 utilizes information from storage unit 1004, such as model parameters 1090, activations 1092, loss values 1094, and gradients 1096. In at least some embodiments, training section 1084 includes sub-sections for performing additional functions, as described in the foregoing flow charts. In at least some embodiments, such sub-sections is referred to by a name associated with a corresponding function.

Aggregating section 1086 is the circuitry or instructions of controller 1002 configured to aggregate neural network models. In at least some embodiments, aggregating section 1086 is configured to train, collaboratively with plurality of computation devices through a network, a neural network model. In at least some embodiments, aggregating section 1086 utilizes information from storage unit 1004, such as model parameters 1090 and gradients 1096. In at least some embodiments, aggregating section 1086 includes sub-sections for performing additional functions, as described in the foregoing flow charts. In at least some embodiments, such sub-sections is referred to by a name associated with a corresponding function.

In at least some embodiments, the apparatus is another device capable of processing logical functions in order to perform the operations herein. In at least some embodiments, the controller and the storage unit need not be entirely separate devices, but share circuitry or one or more computer-readable mediums in some embodiments. In at least some embodiments, the storage unit includes a hard drive storing both the computer-executable instructions and the data accessed by the controller, and the controller includes a combination of a central processing unit (CPU) and RAM, in which the computer-executable instructions are able to be copied in whole or in part for execution by the CPU during performance of the operations herein.

In at least some embodiments where the apparatus is a computer, a program that is installed in the computer is capable of causing the computer to function as or perform operations associated with apparatuses of the embodiments described herein. In at least some embodiments, such a program is executable by a processor to cause the computer to perform certain operations associated with some or all of the blocks of flowcharts and block diagrams described herein.

At least some embodiments are described with reference to flowcharts and block diagrams whose blocks represent (1) steps of processes in which operations are performed or (2) sections of a controller responsible for performing operations. In at least some embodiments, certain steps and sections are implemented by dedicated circuitry, programmable circuitry supplied with computer-readable instructions stored on computer-readable media, and/or processors supplied with computer-readable instructions stored on computer-readable media. In at least some embodiments, dedicated circuitry includes digital and/or analog hardware circuits and include integrated circuits (IC) and/or discrete circuits. In at least some embodiments, programmable circuitry includes reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

In at least some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In at least some embodiments, computer readable program instructions described herein are downloadable to respective computing/processing devices from a computer readable storage medium or to an external computer or external storage device via a network, for example, the Internet, a local area network, a wide area network and/or a wireless network. In at least some embodiments, the network includes copper transmission cables, optical transmission fibers, wireless transmission, routers, firewalls, switches, gateway computers and/or edge servers. In at least some embodiments, a network adapter card or network interface in each computing/processing device receives computer readable program instructions from the network and forwards the computer readable program instructions for storage in a computer readable storage medium within the respective computing/processing device.

In at least some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In at least some embodiments, the computer readable program instructions are executed entirely on the user's computer, partly on the user's computer, as a stand-alone software package, partly on the user's computer and partly on a remote computer or entirely on the remote computer or server. In at least some embodiments, in the latter scenario, the remote computer is connected to the user's computer through any type of network, including a local area network (LAN) or a wide area network (WAN), or the connection is made to an external computer (for example, through the Internet using an Internet Service Provider). In at least some embodiments, electronic circuitry including, for example, programmable logic circuitry, field-programmable gate arrays (FPGA), or programmable logic arrays (PLA) execute the computer readable program instructions by utilizing state information of the computer readable program instructions to individualize the electronic circuitry, in order to perform aspects of the subject disclosure.

While embodiments of the subject disclosure have been described, the technical scope of any subject matter claimed is not limited to the above described embodiments. Persons skilled in the art would understand that various alterations and improvements to the above-described embodiments are possible. Persons skilled in the art would also understand from the scope of the claims that the embodiments added with such alterations or improvements are included in the technical scope of the invention.

The operations, procedures, steps, and stages of each process performed by an apparatus, system, program, and method shown in the claims, embodiments, or diagrams are able to be performed in any order as long as the order is not indicated by "prior to," "before," or the like and as long as the output from a previous process is not used in a later process. Even if the process flow is described using phrases such as "first" or "next" in the claims, embodiments, or diagrams, such a description does not necessarily mean that the processes must be performed in the described order.

An aspect of this description relates to a non-transitory computer-readable medium including instructions executable by a processor to cause the processor to perform operations including training, collaboratively with a computation device through a network, a neural network model by performing, during each of a first plurality of consecutive time periods, operations of receiving, from the computation device, a current set of activations output from a device partition of a neural network model, the neural network model including a plurality of layers partitioned into the device partition and a server partition, applying the server partition to each activation among a preceding set of activations to obtain a current set of output instances, the preceding set of activations received during a preceding time period among the first plurality of consecutive time periods, applying each output instance among the current set of output instances to a loss function relating activations to output instances to obtain a current set of loss values, and computing a set of gradient vectors for each layer of the server partition, including a current set of gradient vectors of a layer bordering the device partition, based on the current set of loss values, and during each of a second plurality of consecutive time periods, operations of transmitting, to the computation device, a preceding set of gradient vectors of the layer bordering the device partition computed during a preceding time period among any of the first plurality of consecutive time periods and the second plurality of consecutive time periods and a preceding set of loss values of the loss function obtained in the preceding time period among any of the first plurality of consecutive time periods and the second plurality of consecutive time periods. The first plurality of consecutive time periods overlaps with the second plurality of consecutive time periods, such that the operations of both the first plurality of consecutive time periods and the second plurality of consecutive time periods are performed in at least two consecutive time periods among both the first plurality of consecutive time periods and the second plurality of consecutive time periods. Each set of activations corresponds to a mini-batch of data samples, wherein a batch of data samples includes a number of mini-batches, and the server partition is applied to the activation corresponding to each data sample in the batch once during the training. The operations further include transmitting the neural network model to the computation device; training the neural network model; receiving a plurality of estimation values from the computation device; estimating an overall collaborative training value representing a duration of time for collaboratively training the neural network model with the computation device; and determining the partition value and the mini-batch value based on the estimating. The plurality of estimation values includes a plurality of device forward pass values, each device forward pass value representing a duration of time consumed by the computation device for activation computing of a corresponding layer among the plurality of layers of the neural network model, and a plurality of device backward pass values, each device backward pass value representing a duration of time consumed by the computation device for gradient vector computing of a corresponding layer among the plurality of layers of the neural network model; the estimating the overall collaborative training value is based on the plurality of device forward pass values, the plurality of device forward pass values, a plurality of activation volume values, each activation volume value representing a volume of data output by activation computing of a corresponding layer among the plurality of layers of the neural network model, a plurality of gradient vector volume values, each gradient vector volume value representing a volume of data output by gradient vector computing of a corresponding layer among the plurality of layers of the neural network model, an uplink bandwidth value representing an uplink bandwidth between the device and the server, a downlink bandwidth value representing a downlink bandwidth between the device and the server, a partition value representing the number of layers of the device partition, and a mini-batch value representing the number of mini-batches in the plurality of mini-batches. The operations further comprise updating, after the training, the weight values of the server partition based on the set of gradient vectors for each layer of the server partition computed during each of the first plurality of consecutive time periods. The operations further comprise: partitioning the plurality of layers of the neural network model into the device partition and the server partition based on the partition value; transmitting, before the training, the device partition to the computation device; performing a plurality of iterations of the training and the updating the weight values; receiving the device partition from the computation device; and combining the device partition with the server partition to obtain an updated neural network model. During the receiving of each of the first plurality of consecutive time periods, receiving a current set of labels from the computation device.

An aspect of this description relates to a non-transitory computer-readable medium including instructions executable by a processor to cause the processor to perform operations including receiving, from the server, a device partition of a neural network model, the neural network model including a plurality of layers partitioned into the device partition and a server partition; training, collaboratively with a server through a network, a neural network model by performing, during each of a first plurality of consecutive time periods, operations of applying a device partition of a neural network model, the neural network model including a plurality of layers partitioned into the device partition and a server partition, to each data sample among a current set of data samples to obtain a current set of activations, transmitting, to the server, a preceding set of activations of a layer bordering the server partition obtained during a preceding time period among any of the first plurality of consecutive time periods, and during each of a second plurality of consecutive time periods, operations of receiving, from the server, a current set of gradient vectors of a layer of the server partition bordering the device partition and a current set of loss values of a loss function relating activations to output instances, computing a set of gradient vectors for each layer of the device partition, based on a preceding set of gradient vectors of the layer of the server partition bordering the device partition and a preceding set of loss values, the preceding set of gradient vectors and the preceding set of loss values received during a preceding time period among any of the first plurality of consecutive time periods and the second plurality of consecutive time periods. During each of the first plurality of consecutive time periods, the operation of applying the device partition consumes a duration of time substantially similar to a duration of time consumed by the operation of transmitting the preceding set of activations of the layer bordering the server partition. During each of the second plurality of consecutive time periods, the operation of receiving the current set of gradient vectors of the layer of the server partition bordering the device partition and the current set of loss values consumes a duration of time substantially similar to a duration of time consumed by the operation of computing the set of gradient vectors for each layer of the device partition. The first plurality of consecutive time periods immediately precedes the second plurality of consecutive time periods. Each set of data samples corresponds to a mini-batch of data samples, wherein a batch of data samples includes a number of mini-batches, and the device partition is applied to each data sample in the batch once during training. The operations further include updating, after the training, the weight values of the device partition based on the set of gradient vectors for each layer of the device partition computed during each of the second plurality of consecutive time periods. The operations further include performing a plurality of iterations of the training and the updating the weight values; and transmitting the device partition to the server. During the transmitting of each of the second plurality of consecutive time periods, transmitting a current set of labels to the server.

An aspect of this description relates to a method including training, collaboratively with a computation device through a network, a neural network model by performing, during each of a first plurality of consecutive time periods, operations of receiving, from the computation device, a current set of activations output from a device partition of a neural network model, the neural network model including a plurality of layers partitioned into the device partition and a server partition, applying the server partition to each activation among a preceding set of activations to obtain a current set of output instances, the preceding set of activations received during a preceding time period among the first plurality of consecutive time periods, applying each output instance among the current set of output instances to a loss function relating activations to output instances to obtain a current set of loss values, and computing a set of gradient vectors for each layer of the server partition, including a current set of gradient vectors of a layer bordering the device partition, based on the current set of loss values, and during each of a second plurality of consecutive time periods, operations of transmitting, to the computation device, a preceding set of gradient vectors of the layer bordering the device partition computed during a preceding time period among any of the first plurality of consecutive time periods and the second plurality of consecutive time periods and a preceding set of loss values of the loss function obtained in the preceding time period among any of the first plurality of consecutive time periods and the second plurality of consecutive time periods. The first plurality of consecutive time periods overlaps with the second plurality of consecutive time periods, such that the operations of both the first plurality of consecutive time periods and the second plurality of consecutive time periods are performed in at least two consecutive time periods among both the first plurality of consecutive time periods and the second plurality of consecutive time periods. Each set of activations corresponds to a mini-batch of data samples, wherein a batch of data samples includes a number of mini-batches, and the server partition is applied to the activation corresponding to each data sample in the batch once during the training. The method further includes transmitting the neural network model to the computation device; training the neural network model; receiving a plurality of estimation values from the computation device; estimating an overall collaborative training value representing a duration of time for collaboratively training the neural network model with the computation device; and determining the partition value and the mini-batch value based on the estimating.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A non-transitory computer-readable medium including instructions executable by a processor of a server to cause the processor to perform operations comprising:
- training, collaboratively with a computation device through a network, a neural network model by performing,
  - during each of a first plurality of consecutive time periods, operations of
    - receiving, from the computation device, a current set of activations output from a device partition of the neural network model, the neural network model including a plurality of layers partitioned into the device partition and a server partition,
    - applying the server partition to each activation among a preceding set of activations to obtain a current set of output instances, the preceding set of activations received during a preceding time period among the first plurality of consecutive time periods,
    - applying each output instance among the current set of output instances to a loss function relating activations to output instances to obtain a current set of loss values, and
    - computing a set of gradient vectors for each layer of the server partition, including a current set of gradient vectors of a layer bordering the device partition, based on the current set of loss values, and
  - during each of a second plurality of consecutive time periods, operations of transmitting, to the computation device,
    - a preceding set of gradient vectors of the layer bordering the device partition computed during a preceding time period among any of the first plurality of consecutive time periods and the second plurality of consecutive time periods and
    - a preceding set of loss values of the loss function obtained in the preceding time period among any of the first plurality of consecutive time periods and the second plurality of consecutive time periods.

2. The non-transitory computer-readable medium of claim 1, wherein the first plurality of consecutive time periods overlaps with the second plurality of consecutive time periods, such that the operations of both the first plurality of consecutive time periods and the second plurality of consecutive time periods are performed in at least two consecutive time periods among both the first plurality of consecutive time periods and the second plurality of consecutive time periods.

3. The non-transitory computer-readable medium of claim 1, wherein
- each set of activations corresponds to a mini-batch of data samples, wherein a batch of data samples includes a number of mini-batches, and
- the server partition is applied to the activation corresponding to each data sample in the batch once during the training.

4. The non-transitory computer-readable medium of claim 3, wherein the operations further comprise:
- transmitting the neural network model to the computation device;
- training the neural network model;
- receiving a plurality of estimation values from the computation device;
- estimating an overall collaborative training value representing a duration of time for collaboratively training the neural network model with the computation device; and
- determining a partition value representing a number of layers of the device partition and a mini-batch value representing the number of mini-batches in a plurality of mini-batches based on the estimating.

5. The non-transitory computer-readable medium of claim 4, wherein
- the plurality of estimation values includes
  - a plurality of device forward pass values, each device forward pass value representing a duration of time consumed by the computation device for activation computing of a corresponding layer among the plurality of layers of the neural network model, and a plurality of device backward pass values, each device backward pass value representing a duration of time consumed by the computation device for gradient vector computing of a corresponding layer among the plurality of layers of the neural network model;

the estimating the overall collaborative training value is based on the plurality of device forward pass values, the plurality of device backward pass values, a plurality of activation volume values, each activation volume value representing a volume of data output by activation computing of a corresponding layer among the plurality of layers of the neural network model, a plurality of gradient vector volume values, each gradient vector volume value representing a volume of data output by gradient vector computing of a corresponding layer among the plurality of layers of the neural network model, an uplink bandwidth value representing an uplink bandwidth between the computation device and the server, a downlink bandwidth value representing a downlink bandwidth between the computation device and the server, a partition value, and a mini-batch value.

6. The non-transitory computer-readable medium of claim 4, wherein the operations further comprise:

updating, after the training, weight values of the server partition based on the set of gradient vectors for each layer of the server partition computed during each of the first plurality of consecutive time periods.

7. The non-transitory computer-readable medium of claim 6, wherein the operations further comprise:

partitioning the plurality of layers of the neural network model into the device partition and the server partition based on the partition value;

transmitting, before the training, the device partition to the computation device;

performing a plurality of iterations of the training and the updating the weight values;

receiving the device partition from the computation device; and combining the device partition with the server partition to obtain an updated neural network model.

8. The non-transitory computer-readable medium of claim 1, wherein during the receiving of each of the first plurality of consecutive time periods, receiving a current set of labels from the computation device.

9. A non-transitory computer-readable medium including instructions executable by a processor to cause the processor to perform operations comprising:

receiving, from a server, a device partition of a neural network model, the neural network model including a plurality of layers partitioned into the device partition and a server partition;

training, collaboratively with the server through a network, the neural network model by performing, during each of a first plurality of consecutive time periods, operations of applying the device partition of the neural network model to each data sample among a current set of data samples to obtain a current set of activations, transmitting, to the server, a preceding set of activations of a layer bordering the server partition obtained during a preceding time period among any of the first plurality of consecutive time periods, and during each of a second plurality of consecutive time periods, operations of receiving, from the server, a current set of gradient vectors of a layer of the server partition bordering the device partition and a current set of loss values of a loss function relating activations to output instances, computing a set of gradient vectors for each layer of the device partition, based on a preceding set of gradient vectors of the layer of the server partition bordering the device partition and a preceding set of loss values, the preceding set of gradient vectors and the preceding set of loss values received during a preceding time period among any of the first plurality of consecutive time periods and the second plurality of consecutive time periods.

10. The non-transitory computer-readable medium of claim 9, wherein, during each of the first plurality of consecutive time periods, the operation of applying the device partition consumes a duration of time substantially similar to a duration of time consumed by the operation of transmitting the preceding set of activations of the layer bordering the server partition.

11. The non-transitory computer-readable medium of claim 9, wherein, during each of the second plurality of consecutive time periods, the operation of receiving the current set of gradient vectors of the layer of the server partition bordering the device partition and the current set of loss values consumes a duration of time substantially similar to a duration of time consumed by the operation of computing the set of gradient vectors for each layer of the device partition.

12. The non-transitory computer-readable medium of claim 9, wherein the first plurality of consecutive time periods immediately precedes the second plurality of consecutive time periods.

13. The non-transitory computer-readable medium of claim 9, wherein each set of data samples corresponds to a mini-batch of data samples, wherein a batch of data samples includes a number of mini-batches, and the device partition is applied to each data sample in the batch once during the training.

14. The non-transitory computer-readable medium of claim 9, wherein the operations further comprise:

updating, after the training, weight values of the device partition based on a set of gradient vectors for each layer of the device partition computed during each of the second plurality of consecutive time periods.

15. The non-transitory computer-readable medium of claim 14, wherein the operations further comprise:

performing a plurality of iterations of the training and the updating the weight values; and transmitting the device partition to the server.

16. The non-transitory computer-readable medium of claim 9, wherein during the transmitting of each of the second plurality of consecutive time periods, transmitting a current set of labels to the server.

17. A method comprising:

training, collaboratively with a computation device through a network, a neural network model by performing, during each of a first plurality of consecutive time periods, operations of receiving, from the computation device, a current set of activations output from a device partition of the neural network model, the neural network model including a plurality of layers partitioned into the device partition and a server partition, applying the server partition to each activation among a preceding set of activations to obtain a current set of output instances, the preceding set of activations received during a preceding time period among the first plurality of consecutive time periods, applying each output instance among the current set of output instances to a loss function relating activations to output instances to obtain a current set of loss values, and computing a set of gradient vectors for each layer of the server partition, including a current set of gradient vectors of a layer bordering the device partition, based on the current set of loss values, and during each of a second plurality of consecutive time periods, operations of transmitting, to the computation device, a preceding set of gradient vectors of the layer bordering the device partition computed during a preceding time period among any of the first plurality of consecutive time periods and the second plurality of consecutive time periods and a preceding set of loss values of the loss function obtained in the preceding time period among any of the first plurality of consecutive time periods and the second plurality of consecutive time periods.

18. The method of claim 17, wherein the first plurality of consecutive time periods overlaps with the second plurality of consecutive time periods, such that the operations of both the first plurality of consecutive time periods and the second plurality of consecutive time periods are performed in at least two consecutive time periods among both the first plurality of consecutive time periods and the second plurality of consecutive time periods.

19. The method of claim 18, wherein each set of activations corresponds to a mini-batch of data samples, wherein a batch of data samples includes a number of mini-batches, and the server partition is applied to an activation corresponding to each data sample in the batch once during the training.

20. The method of claim 19, further comprising:

transmitting the neural network model to the computation device;

training the neural network model;

receiving a plurality of estimation values from the computation device;

estimating an overall collaborative training value representing a duration of time for collaboratively training the neural network model with the computation device; and determining a partition value representing a number of layers of the device partition and a mini-batch value representing the number of mini-batches in a plurality of mini-batches based on the estimating.

* * * * *